United States Patent [19]

Frey, Jr.

[11] 3,757,732
[45] Sept. 11, 1973

[54] DIGITAL-INDICATING KNOB-ENCLOSED MULTI-TURN POTENTIOMETER

[75] Inventor: Sydney W. Frey, Jr., Upland, Calif.

[73] Assignee: Bourns, Inc., Riverside, Calif.

[22] Filed: Jan. 10, 1972

[21] Appl. No.: 216,520

[52] U.S. Cl................ 116/115, 116/133, 235/103, 338/196
[51] Int. Cl........................................... G01p 13/00
[58] Field of Search............... 116/115, 124, 115.5, 116/133; 340/381; 235/103; 338/196; 240/8.14, 8.16; 248/27

[56] References Cited
UNITED STATES PATENTS

| | | | |
|---|---|---|---|
| 2,701,297 | 2/1955 | Thibault | 240/8.16 X |
| 2,742,636 | 4/1956 | Alden | 340/381 |
| 2,777,637 | 1/1957 | Matthew | 235/103 |
| 3,134,086 | 5/1964 | Caddock et al. | 338/196 |
| 3,370,260 | 2/1968 | Hardison et al. | 338/196 |
| 3,402,693 | 9/1968 | Tweed et al. | 116/115 |
| R25,674 | 11/1964 | Hardison et al. | 338/143 |

*Primary Examiner*—Louis J. Capozi
*Attorney*—Fritz B. Peterson

[57] ABSTRACT

A knob-enclosed multi-turn precision potentiometer having at its front end a turns-counting and indicating device effective to furnish an accurate decimal-digit indication of the current position of the potentiometer wiper relative to a zero position at one end of the helical resistance element, the potentiometer having means for permitting instant mounting in a standard aperture in an instrument panel of any of a plurality of standard thickness gages and the indicator means presenting accurate indications of fractions of hundredths of one turn from zero to ten turns to accommodate the full range of operation of a 10 turn precision potentiometer, and the indicator further having simplified means for connection with the potentiometer comprising a serrated plug press-fitted into a receiving bore in a supporting member of the potentiometer.

5 Claims, 9 Drawing Figures

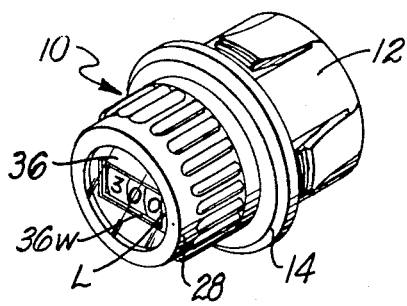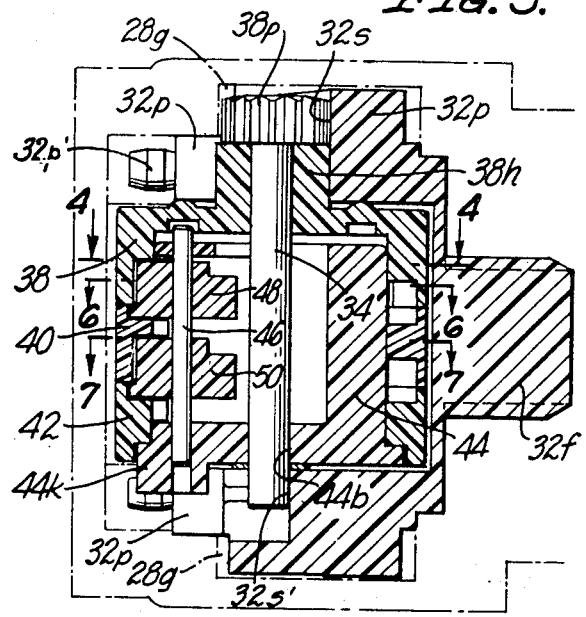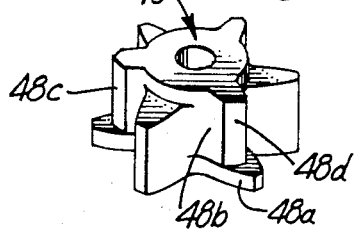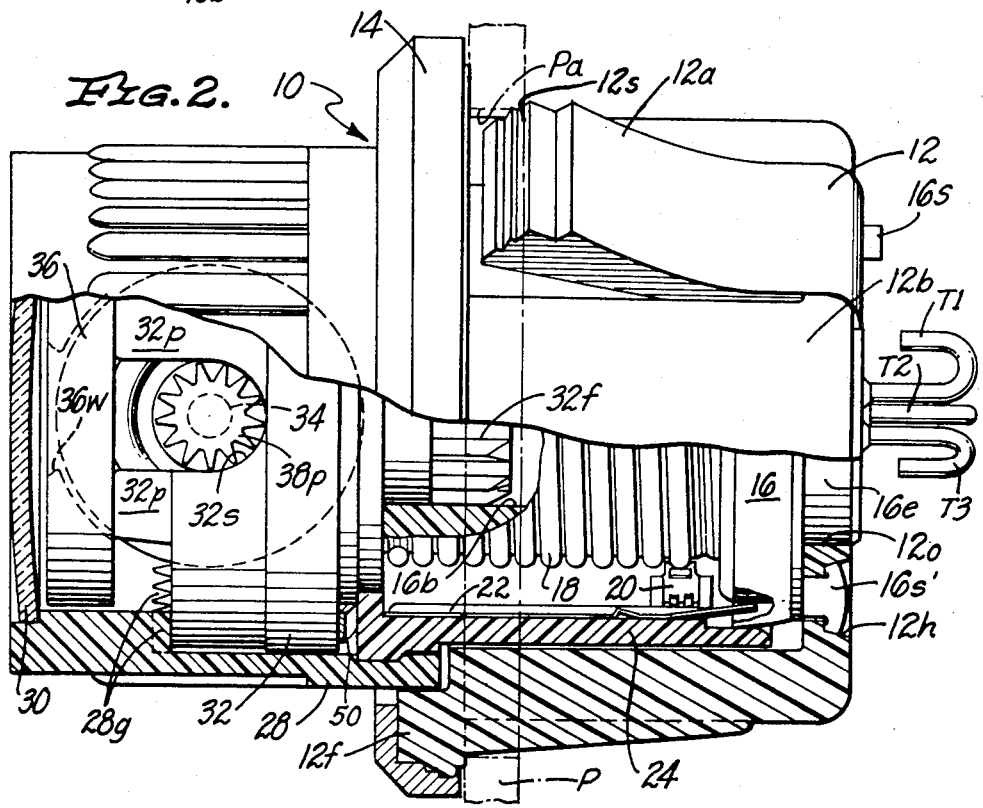

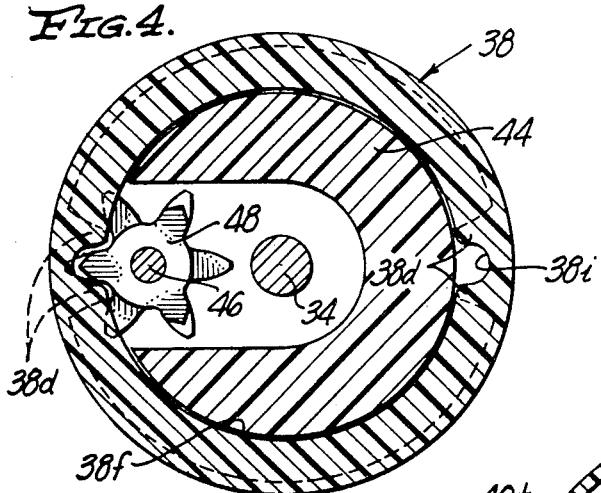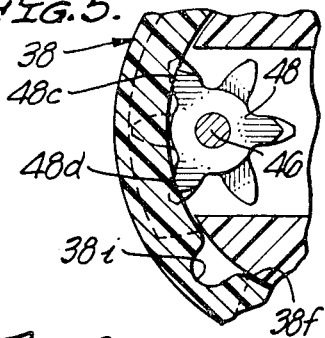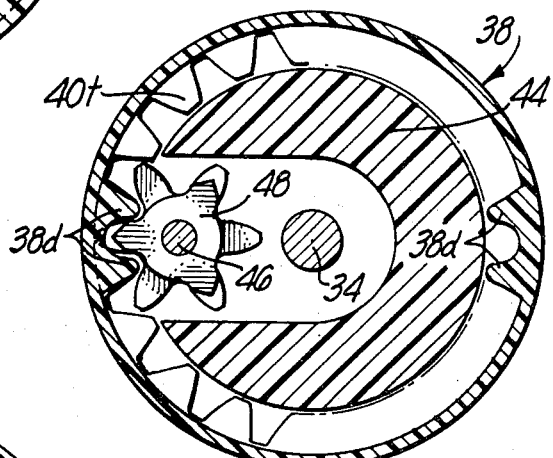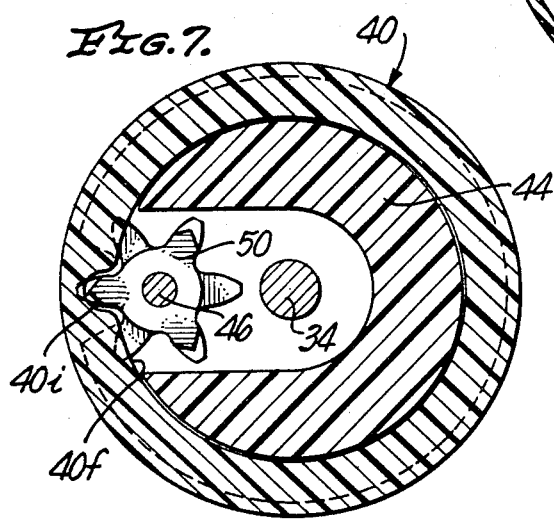

DIGITAL-INDICATING KNOB-ENCLOSED MULTI-TURN POTENTIOMETER

CROSS REFERENCES

In respect of certain features herein disclosed this disclosure is related to one or more of co-pending applications, viz: Ser. No. 192,119, filed Oct. 26, 1971 now U.S. Pat. No. 3,723,937, entitled PRECISION POTENTIOMETER WITH INDICATOR, AND METHOD, by Sydney W. Frey, Jr., Donald L. Gaa, and Robert W. Tetamore; application Ser. No. 216,470, filed concurrently with this disclosure, entitled JUNCTURE OF CIRCULAR MEMBERS, by Delbert L. Singleton, Sydney W. Frey, Jr., and Donald L. Gaa, and application Ser. No. 216,400, filed concurrently with this disclosure, entitled INSTRUMENT SUPPORTING DEVICE, by Sydney W. Frey, Jr., and Donald L. Gaa; and application Ser. No. 216,432, filed concurrently with this disclosure entitled IMPROVED DIGITAL READ-OUT ACTUATOR-INDICATOR FOR MULTI-TURN SHAFT-ACTUATED INSTRUMENTALITIES, by Robert E. Gaskill and Sydney W. Frey, Jr.

BRIEF SUMMARY OF THE INVENTION

In the prior art, knob-enclosed multi-turn potentiometers are known, such potentiometers having clock-type indicating means on the front end thereof for providing a visible indication of the extent of displacement or traverse of the wiper or contact of the instrument along the helical resistance element. Such an integrated instrument is disclosed in detail in U.S. Pat. No. Re. 25,674 for example. In that prior art, one hand or pointer of the clock-like indicator presented the appearance of an hour-hand of a clock and presented an indication of the number of full turns of the contact displacement from the "zero" end of the resistance element; and a longer hand or pointer appeared like a clock minute-hand and presented an indication of fractional parts of a turn of contact displacement above and beyond the zero or any full-turn displacement of the contact. While the indications provided are accurate, and by means of an improvement disclosed in U.S. Pat. No. 3,134,086 all ambiguity between a zero indication and the indication representing 10 full turns of displacement is eliminated, nevertheless in many instances it is undesirable to have to read the indications presented by two different pointers or hands and accordingly it is in those instances preferable to have the indication presented as a decimal numerical indication. For example, with the noted prior art indicator for a knob-enclosed potentiometer, the clock-face is in the form of a dial presenting numerical indications from 0 through 9, with intervening fractional parts denoted by divisions similar to minute divisions on a clock dial, an operator is required to first note the position of the full-turns pointer and mentally add to that indication the numerical value indicated by the fraction indicator or pointer. Erroneous interpretations occur as a consequence due to erroneous mental arithmetical operations and/or erroneous visual reading of the indications. Thus it is desirable to have an indicator that is directly operated by the rotatable shell that actuates the slider or contact as in the noted prior art instrument, but which presents directly a decimal number indication of the contact displacement. The present invention accomplishes that result by indicator means that do not rapidly wear with consequent short effective lifetime and early failure, and which indicator means are directly driven and operated by the same manually-operated cylindrical shell that actuates the potentiometer contact. The shell, rather than driving the end of a pointer as in the noted prior art, is formed with an internal annular face gear that drives a first indicator number wheel at a low gear ratio of 5-to-1. The first number wheel steps a pinion twice each revolution, that is once each half-revolution, of the first number wheel, whereby the first number wheel presents, via a novel arrangement of decimal number indicia on its face, a direct indication of hundredths of one revolution of the shell and potentiometer contact, and an indication of fractions of hundredths of one revolution. A second number wheel, stepped by the intervening pinion through 1/10 revolution twice during each complete revolution of the first number wheel, registers or indicates tenths of a revolution of the shell and contact.

A third number wheel is stepped one-tenth of a revolution by the second number wheel, through an intermediate second indexing pinion, once each revolution of the second number wheel, and thus registers or indicates the number of full turns traversed by the contact from the zero position of the latter at one end of the helical resistance element. The arrangement of the number wheels is side-by-side along a common axis, and thus the indicator presents to view an instantly readable decimal-number indication of the position of the potentiometer contact along the ten-turn extent of the resistance element. For example, a typical indication is 3.96, indicative of 3.96 revolutions of the actuating shell and traverse of the contact through 3.96 turns along the helix of the element. As will be made evident, fractional values of 1/100 of one revolution of the contact may be accurately read or estimated, for example 3.965 may be directly read, and other thousandths values easily estimated at a glance. Because of the characteristics of the counting mechanism of the indicator, and the unique direct-driving connection from the actuating shell to both the indicator and the contact device of the potentiometer, extremely accurate resetting of a previously recorded setting or adjustment may easily be effected. The potentiometer is carried in a cage adapted for easy and instant insertion in an aperture in a panel, whereby conventional mounting by nut and washer means is obviated and necessity for simultaneous access to both front and read of the panel is overcome. The potentiometer is devised to be secured in the cage with the rotary shell and indicator extending forwardly and from the front panel surface, and the terminals extending rearwardly from the cage on the other side of the panel.

That portion of the indicator means that is acutated by the rotatable manually-operated shell comprises a frame in which the number wheels are disposed about a body in which index-pinion means are mounted. The frame comprises a keyed rearwardly-extending fluted stub that tightly fits in a complementary bore or hole provided in the central rigid support member of the potentiometer. Thus the numerical indicia on the turns-counting and indicating means can readily be phased or aligned with the mounting means without further adjustment. Phasing of the read-out to the potentiometer contact is accomplished through a manually rotatable interlock between the indicator and the potentiometer rotary shells. The potentiometer is illustrated in pre-

DESCRIPTION OF THE DRAWINGS

FIG. 1 is a pictorial representation, to no particular scale, of the potentiometer as mounted in the snap-in cage with decorative bezel;

FIG. 2 is an enlarged side view of structure of FIG. 1, partly in section and with some parts broken away to reveal details;

FIG. 3 is a transverse sectional view of the indicator mechanism, with actuating knob shell means indicated in phantom;

FIGS. 4, 5, 6 and 7 are sectional views taken as indicated by directors 4—4, 6—6, and 7—7 in FIG. 3, FIG. 5 being a fragmentary view illustrating a locking feature but otherwise similar to FIG. 4;

FIG. 8 is a pictorial view of a stepping pinion; and

FIG. 9 is a plan view illustrating the arrangement of indicia on number-wheels of the indicator.

DETAILED DESCRIPTION OF THE DRAWINGS

Referring first to FIG. 1, there is depicted an assembled device 10 according to the invention, the device comprising a snap-in mounting cage or chassis 12 adapted to be pressed into a dimensioned aperture in an instrument panel and thereby be secured to the panel in a manner and by means fully disclosed and explained in the previously identified concurrently-filed application for Letters Patent of Sydney W. Frey, Jr., and Donald L. Gaa. Further, the device 10 comprises, secured to the chassis 12, a decorative and functional-performing circular bezel 14, described and explained in the aforementioned concurrently-filed application for Letters Patent of Delbert S. Singleton, Sydney W. Frey, Jr. and Donald L. Gaa. Further, the device 10 comprises an indicator mechanism of a novel type denoted generally by the number 16, the details of which indicator mechanism are disclosed and described, with the exception of modifications herein described in detail, in the aforementioned application for Letters Patent of Robert E. Gaskill and Sydney W. Frey, Jr., entitled IMPROVED DIGITAL READ-OUT ACTUATOR-INDICATOR FOR MULTI-TURN SHAFT-ACTUATED INSTRUMENTALITIES. Reference to the above-identified disclosures may be made if necessary, those disclosures being incorporated herein by reference.

As is indicated in FIG. 2, the chassis 12 comprises a plurality of resilient limbs such as 12a that are integral with the generally cylindrical body 12b of the chassis at their rear ends and are stressed to spring outwardly after being forced inwardly by cam action on the peripheral circular surface around an aperture Pa in a panel (indicated in phantom lines an denoted by the letter P in the drawing). The forward end of the chassis terminates in a radially outwardly extending circular flange 12f the rear face of which is adapted to abut against the front surface of the panel P around and outside the aperture Pa. The flange is reinforced and enhanced in appearance by the aforementioned metallic ring or bezel 14. The chassis is of generally cup-like formation, having a circularly-arranged set of stepped holes, such as 12h (FIG. 2), in bottom, in which are received fastening means for securing the potentiometer support member of the chassis. Further, the bottom of the chassis has a central opening 12o which receives with a close fit a rearwardly-extending plug-like extension 16e of the potentiometer support member 16. The extension has extending therethrough and protruding therefrom a set of three spaced-apart terminal wires T1, T2 and T3, similar to those depicted in the aforementioned U.S. Pat. No. Re. 25,674. The terminal wires are mutually insulated by virtue of the insulative characteristic of the thermoplastic resin from which support member 16 is formed. The support member is originally formed with a circularly arranged series of rearwardly-extending fastener posts 16s (upper right, FIG. 2) each of which is dimensioned and spaced to fit in and extend through a respective one of the holes 12h in the base of the chassis. At the time of assembly of the indicating potentiometer to the chassis, each of the posts 16s is thermoplastically deformed and headed in the enlarged portion of its respective hole, as indicated at 16s' at the lower right in FIG. 2. Since the entire potentiometer and indicator portion of the device is supported by and upon the support member 16, it is evident that the chassis serves to secure the instrument portion of the device securely to the panel.

As is explained in the aforementioned disclosure in the application for Letters Patent of Sydney W. Frey, Jr. and Donald L. Gaa, the limbs of the chassis 12, such as limb 12a, are formed with inclined steps as indicated at 12s in FIG. 2, whereby the chassis automatically adapts itself to panels of a variety of thicknesses.

The multi-turn knob-enclosed precision potentiometer comprised in the device 10 includes a helical resistance element 18 mounted in a helical groove on the forward end of the support member 16, a rotary generally cylindrical shell 24 and a contact-carrying slider 20 driven along the element by the shell, and return-conductor means 22, all like or similar to their counterparts or functional equivalents disclosed in Pat. No. Re. 25,674. According to the present invention the support member 16 is produced with a cylindrical bore 16b in its forward end, the bore being dimensioned to receive with a tight drive fit the rearwardly-extending peripherally-fluted plug-like rear end 32f of an indicator support 32. The indicator support 32 is formed with two sets of forwardly-extending pillars or pedestals 32p shaped to provide a pair of saddles 32s and 32s' (FIG. 3) in which are seated a hub 38h of a first number wheel 38 presently described, and a shaft or spindle 34.

A circular frame 36 (FIG. 2) is mounted on the forward ends of the pedestals 32p, as by means such as pins 32p' (FIG. 3) formed on the pedestals and tightly received in complementary sockets formed in the rear face of the frame, or by adhesive or other known fastening means. The frame is fenestrated to provide a window 36w (FIG. 1) through which numerical and other indicia may be viewed.

The rotary slider-driving shell 24, as is indicated in FIG. 2, is extended forwardly by an extension or forward shell, 28, that is secured to the rear shell 24, for example, adhesive, or by a tight twist lock structure as illustrated. The forward shell 28, extending forwardly of the panel P, serves the plural functions of providing a manually rotatable knob-like structure for rotational manipulation by an operator in adjusting the potentiometer, of housing and protecting the indicator mechanism of mounting a protective lens, and of driving the indicator mechanism incident to adjustment of the potentiometer.

Mounted on, and carrying one end of spindle 34 (FIG. 3) is a combined first drive pinion and number wheel, 38, the outer end of which is formed as a pinion 38p. Both the hub 38h and the pinion portions of wheel 38 are received in the seat or saddle 32s. The end of spindle 34 (opposite from pinion 38p seats snugly in the saddle 32s', and thus the spindle is retained in a stable attitude, and in a mutually-aiding relationship, stabilizes wheel 38 in a rotational attitude for rotation about the axis of the spindle in a plane perpendicular to the axis.

The first number wheel drive pinion, 38p, is complementary to and is engaged by the teeth 28g (FIG. 3) of a rearwardly-facing driving gear formed on an inner face of shell 28. Thus rotation of the shell to adjust the contact along the resistance element of the device causes rotation of pinion 38p and number wheel 38. In accord with the invention, and differing from prior-art practice and construction of digital turns-counting mechanisms for potentiometers, such as that illustrated in U.S. Pat. No. 2,777,637 for example, the ratio of the number of teeth 28g of the driving gear to the number of teeth of pinion 38p is 5 to 1 rather than 10 to 1. Thus the first number wheel of the indicator rotates only five revolutions each revolution of shell 28. Several marked and novel advantages accure from this structural change, as wil hereinafter be made clearly evident.

In conventional or prior art digital indicators for precision potentiometers, the first number wheel is employed to indicate hundredths of one revolution of the contact, the second number wheel to indicate tenths of one revolution, and a third number wheel to indicate individual complete revolutions, up to and including 10 revolutions. Additional number wheels are employed for potentiometers having more than 10 turns or convolutions of the resistance element. In the present invention a 10-turn resistance element is employed, and hence three number wheels, 38, 40 and 42 are used (FIG. 3). Further, since the ratio of revolutions of the contact and slider to revolutions of shell 28 and gear 28g is 1-to-1, and the ratio of revolutions of gear 28g to pinion 38p is 5-to-1, each half revolution of number wheel 38 represents 10/100 of a revolution of the contact along the resistance element. Accordingly, the numerical indicia on wheel 38 are deviced and arranged to represent 10/100 of one turn of the potentiometer on each half of the peripheral face of that wheel. Such an arrangement of indicia is illustrated in strip form in the right-hand column in FIG. 9, wherein the indicia strips for each of the three number wheels 38, 40 and 42 are shown as straightened rim faces of those wheels. Therein, the indicia for wheel 38 are noted to comprise the series of numerals 2 - 4 - 6 - 8 - 0 - 2 - 4 - 6 - 8 - 0 and thus to numerically extned twice through the series of decimal numbers 0 to 10. In the interest of readability in the small-diameter device illustrated in the drawing, the odd numerals of the decimal series are omitted and a short line substituted for each odd number, as indicated in the right-hand column in FIG. 9. Intermediate lines, as indicated in the drawing, are provided to facilitate reading or setting of the potentiometer to fractional values less than 1/100 of one revolution of the contact.

As is indicated in FIG. 1, a ledger or index line L is provided on the front face of member 36, aligned with the center of the window 36w and disposed for registry with the number-representing lines on wheel 38, to facilitate instantaneous visual reading of the value presented by the number wheels.

Since each half-revolution of first number wheel 38 represents a full tenth (10/100) of one revolution of shell 28, provision is made for indexing or stepping the second number wheel one step (one tenth of a revolution) during each half-revolution of the first number wheel. As is shown in FIG. 3, the second and third number wheels, 40 and 42, are formed as rings presenting cylindrical indicia-bearing outer faces and internal faces presenting at one end a continuous set of gear teeth. The wheels 40 and 42 encircle a hollow carrier 44 whose interrupted cylindrical surface provides a bearing surface on which the wheels may be rotated and on which they are disposed in end-to-end stacked relation relative to wheel 38, as is common in revolution-counting mechanisms. The carrier is formed with a bore 44b at its inner flanged end, in which bore one end of spindle 34 is received. Thus the carrier is supported by the spindle, suspended between the flange end of number wheel 38 at one end and the pillars 32p at the other end. The carrier has an outstanding projection 44k (FIG. 3) that is received in a complementary recess in the inner face of frame 36, the arrangement providing alignment of the numerals with window 36w and preventing rotation of the carrier on spindle 34.

The carrier 44 is provided with aligned bores in which is tightly carried with a press fit an index-gear shaft 46 (FIG. 3) on which are supported for free rotation first and second indexing gears or pinions 48 and 50 of like form and shape as shown in FIG. 8 wherein only pinion 48 is shown. Pinion 48 comprises a six-tooth output or number-wheel-driving section 48a, and a six-tooth central input portion 48b alternate teeth of which are shortened and formed with oppositely inclined faces such as 48c and 48d that are configured to coact with an interrupted circular inner flange face of a respective number wheel, for example face 38f on wheel 38 depicted in FIG. 5. Hence the inclined faces are effective to lock the pinion against undesirable rotation, but permit step-rotation when an input portion tooth thereof is engaged by an internal tooth formation on a preceding or driving number wheel, as, for example, either of the formations 38d on wheel 38 depicted in FIG. 4. Clearance for either of the three locking tooth portions is provided in the flange 38f at two opposite locations, such as at 38i in FIG. 4. Thus, for example, the tooth formation 38d, in rotating, engages successively two input teeth of pinion 48 to rotate the latter, the interruption of flange 38f in the region intermediate the teeth of formation 38d permitting such stepping, and the next succeeding set of inclined faces of the locking portions of the pinion teeth being brought into sliding contact with flange 38f as shown in FIG. 5. It will be noted that the ends of the three pinion teeth intervening between those with inclined faces 48c and 48d are shortened or eliminated entirely in the plane of flange 38f, to provide clearance for the flange.

The first number wheel 38, is formed or provided with a pair of oppositely disposed driving-tooth formations 38d, as indicated in FIG. 6. The space between the two teeth of either formation is aligned with a respective interruption 38i of the flange 38f, as previously indicated and as is shown in FIG. 5. Thus twice during any revolution of wheel 38 in either direction a tooth formation such as 38d engages and drives the index pinion through a two-tooth step. The output portion of the first indexing pinion 48, comprising the six full-teeth portion 48a (FIG. 8) is engaged continuously with the internal series of teeth on second number wheel 40, as indicated in FIG. 3. That series comprises 20 teeth, hence at each stepping of pinion 48 the second number wheel is advanced 1/10 of a revolution to change the indication presented at the center digit in window 36w by one decimal digit.

Second number wheel 40 comprises only one two-tooth pinion-driving formation, as indicated in FIG. 7; and accordingly will step the second indexing pinion 50 only one two-teeth step per revolution. Pinion 50 is at other stages locked by an internal interrupted flange 40f on number wheel 40, similar to the locking flange of wheel 38 excepting that only a single interruption, 40i, is provided, aligned with the two-tooth driving formation. Thus at each revolution of wheel 40 the pinion 50 advances the third number wheel 42 two teeth, changing the exhibited digit in the first (left-hand) number space in window 36w one decimal digit. The operation of the second indexing pinion 50 and the third number wheel 42 is like or similar to that of the similarly-related components of a conventional revolution counter; and the operation of the entire rotation-counter and indicator portion of the device is substantially the same as that disclosed in the aforementioned application of Robert E. Gaskill and Sydney W. Frey, Jr.

In the described device, the teeth 28g of the gear portion of extension shell 28 are 65 in number, and those of pinion 38p of the first number wheel are 13 in number. Considerable advantages and improvements are provided and permitted by employment of that 5-to-1 gear ratio. That ratio is but one-half the ratio of prior-art digital revolution counters and indicators, which used gearing of 10 to 1 ratio. The 5-to-1 ratio is feasible because of the utilization of first number wheel 38 to register 20/100 of one shell revolution, rather than only 10/100 revolutions as in the prior art. One advantage of the 5-to-1 gear ratio arrangement is that in small-diameter devices, for example devices less than 1 inch shell diameter, the first wheel pinion despite having to be of very small diameter, can be produced with strong gear teeth of substantially standard profile, rather than with weak roots as when only half as many teeth are used. A second and very important advantage is that wear is reduced by 50 percent since the critical pinion for the first number wheel rotates only half as much as would the pinion in a 10-to-1 gear ratio arrangement. A third advantage is that the first wheel pinion can be larger, for a prescribed shell-gear diameter, which permits of the pinion being formed of thermoplastic material whereas in the prior art the first pinion was required to be of metal if reasonable operating-lifetime was to be assured and defective operation due to excessive pinion wear avoided. A fourth advantage is that due to the increased size permitted for pinion 38p and the reduction of wearing by 50 percent, with the consequent ability of a thermoplastic pinion to successfully operate satisfactorily throughout a long operating lifetime, the pinion and first number wheel may be formed as a single unitary integral part, with a simple dowel pin shaft, rather than as separate parts of an assembly consisting of a machined metal pinion, a shaft, and a molded number wheel as in the prior art devices. Another advantage afforded by the 5-to-1 driving gear ratio is the gross reduction of impact-loading of the indexing pinions and consequent reduction of wear and liability of injury or fracture from such loading. Since impact loading, as when a two-tooth formation of a number wheel steps a pinion, varies in proportion to the second power of the velocity, the reduction of the primary drive speed by 50 percent results in a reduction of impact loading to about one-fourth of that incurred with a 10-to-1 gear ratio driving arrangement. Thus impact loading and consequences thereof are by the present arrangement rendered inconsequential. A further benefit is achieved in this assembly with a backlash spring 50 which sets under the indicator support 32 and holds it in contact with gear 28g. It is thus possible to keep gear mesh errors such as backlash at a minimum without applying the tension, which would result in binding and roughness, directly to pinion 38p.

As is evident from the preceding description and the drawings, the sequence of assembly would be as follows. The contact-carrying slider 20 is placed in the shell 24 and these are set on the support member 16. The backlash spring 50 is set on top of the shell 24 and the indicator support 32 is pressed into the potentiometer support 16 by forcing splined stub 32f into the bore 16b. Thereafter the previously assembled indicator mechanism is set into saddles 32s and 32s' and the circular frame 36 is pressed onto pins 32p'. The lens 30 and forward shell 28 are set on the assembly, engaging gears 28g and 38p and rear shell 24. Due to the relatively close fit relationship of the parts, it is now possible to bring the slider 20 up against a stop on the bottom of the indicator support 32 and adjust the indicator read-out to 0 - 0 - 0 by rotating shell 28 while holding shell 24 steady. After an initial check to quality standards, the splined stub is cemented to the support member and the cement joint between the shells is filled. Thereafter the potentiometer and indicator assembly is moved into chassis 12 and posts 16s heat-swaged into the ends of holes 12h of the chassis. Bezel 14 is alternatively applied to the chassis before, or following assembly of the potentiometer into the chassis, or may be omitted if the added strength, etc. is not necessary. Thus at completion of assembly of the noted subassemblies, the indicator means are accurately phased with the potentiometer and the device is ready for easy manual pressing into a mounting panel for instant locking thereto.

Having disclosed a preferred embodiment of the invention, I claim:

1. A digital turns-indicating potentiometer device comprising:
   first means, including a support means and means for securing the device in an aperture in an instrument panel;
   second means, including a potentiometer element and contact-carrier means, supported by said support means;
   third means, including a decimal digital indicator means, supported by said support means and comprising a set of number wheels at the forward end thereof for presentation of a decimal digital indication of the extent of traverse of said contact-carrier along said element, indexing pinion means connected to said number wheels for stepping said number wheels relative to a preset amount of rotation of its next adjacent number wheel, and indexing teeth means carried by all but a last number wheel for engaging said indexing pinion means, a first of said number wheels including two indexing teeth formations said two indexing teeth formations located diametrically opposed to each other for stepping a second number wheel through two 1/10 revolution steps for each complete revolution of said first number wheel; and fourth means, including rotary shell means disposed around said second and third means and engaging said contact-carrier to drive the same along said element, said shell means comprising gear means geared to said indicator means to rotate said first number wheel five revolutions and said contact carrier one revolution for each complete revolution of said shell means and further serving as a knob-like structure adapted for manual manipulation for concurrently adjusting said contact-carrier and driving said indicator means to provide a digital numerical indication of the position of said carrier along said element.

2. A device as specified in claim 1, in which said element is a multi-turn helical resistance element disposed on said support means.

3. A device as specified in claim 1, in which said means for securing the device in an aperture in an instrument panel comprises a cup-like structure having a flange arranged to bear against the front face of a panel with the body thereof extending through and rearwardly of the panel, said cup-like structure comprising outwardly-stressed resilient limbs adapted to be forced inwardly while the structure is being pressed into the aperture and to spring outwardly and engage the panel at the rear thereof to secure the structure to the panel, and the said support means being secured to said structure.

4. A device as specified in claim 1, in which said element is a helical element disposed on said support means about an axis, and said support means and said indicator means comprise in one a bore along said axis and on the other a projection secured in said bore, whereby said indicator means is secured to said support means in axial alignment therewith.

5. A device according to claim 1, in which said set of number wheels comprises first second and third number wheels and said indicator means comprises means for rotating the second number wheel 1/10 revolution during each half-revolution of the first number wheel and for rotating the third number wheel 1/10 revolution during each revolution of the second number wheel.

* * * * *

UNITED STATES PATENT OFFICE
CERTIFICATE OF CORRECTION

Patent No. 3,757,732    Dated September 11, 1973

Inventor(s) Sydney W. Frey, Jr.

It is certified that error appears in the above-identified patent and that said Letters Patent are hereby corrected as shown below:

Column 4, Line 58, insert --by-- after "shell 24".

Column 5, Line 6, "(opposite" should read --opposite--. [remove parentheses]

Column 5, Line 26, "accure" should read --accrue--.

Column 5, Line 27, "wil" should read --will--.

Column 5, Line 45, "deviced" should read --devised--.

Column 5, Line 55, "extned" should read --extend--.

Column 10, Line 17, insert --,-- after "first".

Signed and sealed this 17th day of December 1974.

(SEAL)
Attest:

McCOY M. GIBSON JR.
Attesting Officer

C. MARSHALL DANN
Commissioner of Patents